May 29, 1928.

J. LOCKHART

CONVEYER

Original Filed Sept. 3, 1926     4 Sheets-Sheet 1

1,671,534

May 29, 1928.

J. LOCKHART

CONVEYER

Original Filed Sept. 3, 1926  4 Sheets-Sheet 2

1,671,534

Inventor
James Lockhart
Kivs Hudson &
Kent.
Attorneys

May 29, 1928. 1,671,534
J. LOCKHART
CONVEYER
Original Filed Sept. 3, 1926   4 Sheets-Sheet 3
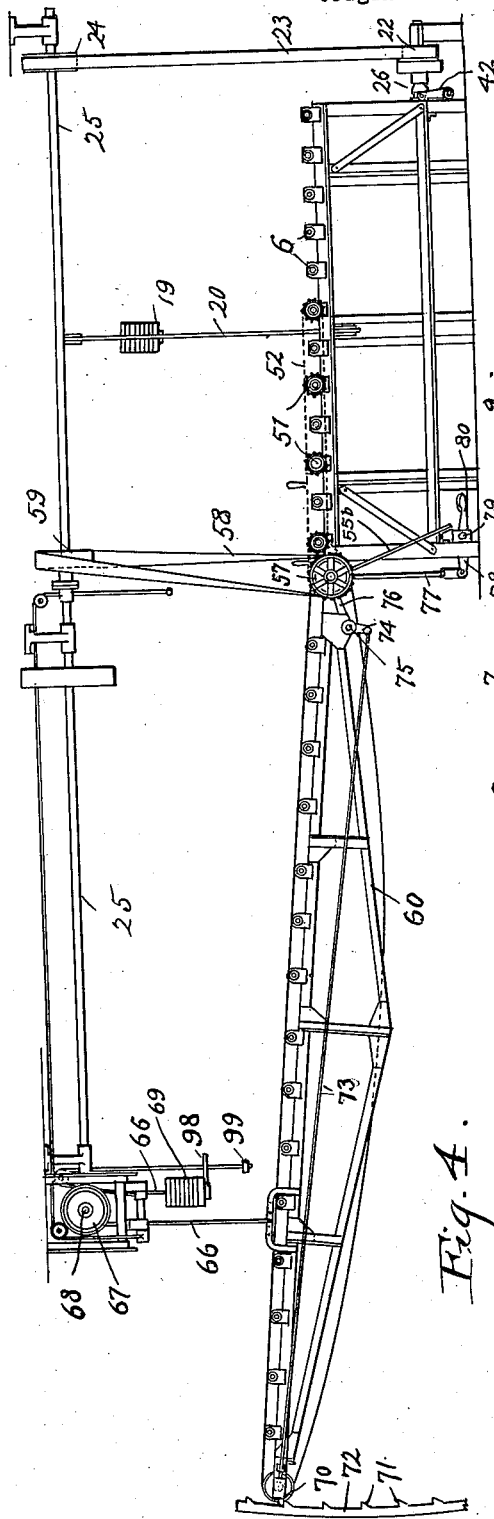
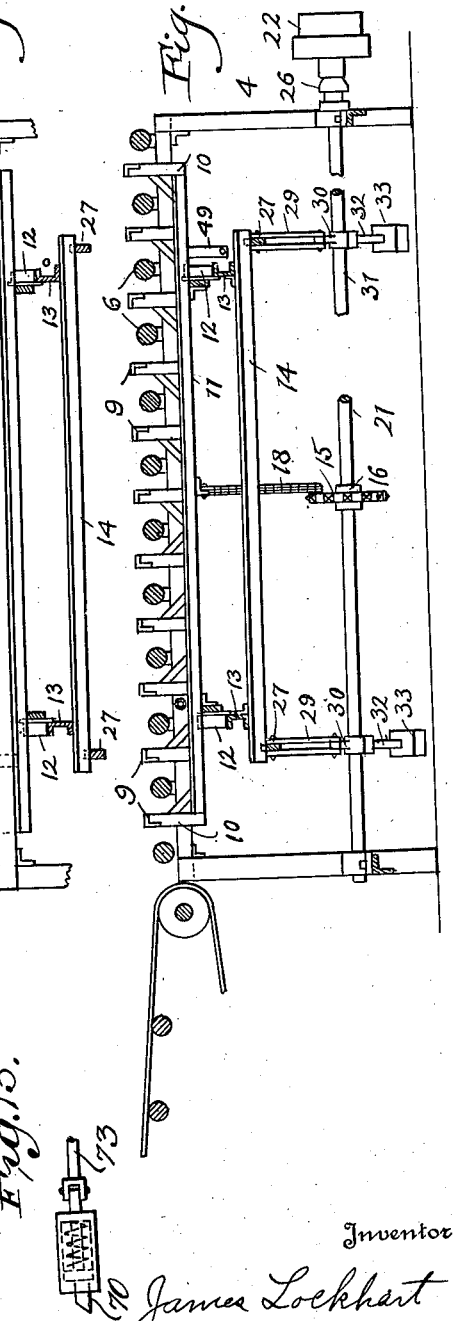
Inventor
James Lockhart
By Knox Hudson & Kent
Attorneys May 29, 1928.

J. LOCKHART

CONVEYER 1,671,534

Original Filed Sept. 3, 1926  4 Sheets-Sheet 4

Inventor
James Lockhart
By Kwe Hudson & Kent
Attorneys

Patented May 29, 1928.

1,671,534

UNITED STATES PATENT OFFICE.

JAMES LOCKHART, OF PAINESVILLE, OHIO, ASSIGNOR TO THE COE MANUFACTURING COMPANY, OF PAINESVILLE, OHIO, A CORPORATION OF OHIO.

CONVEYER.

Application filed September 3, 1926, Serial No. 133,366. Renewed March 31, 1928.

This invention relates to conveyers and more particularly to a combination of conveyers including a transfer device by which elongated articles, such as pieces of composition board, may be transferred from one conveyer to another spaced laterally therefrom.

The present invention has for an object to provide a transfer device provided with a receiving portion upon which articles are delivered one at a time and with a transfer carrier which is under the control of an operator and which may be actuated upon delivery of an article to the receiving portion to transfer the article from the receiving portion and by its successive actuations to convey the articles so transferred, step by step, and deliver the same one at a time to a discharge conveyer.

A further object of the invention is to provide a simple and ruggedly constructed transfer mechanism which has few parts, which can be manufactured at a low cost, and in which the expense of maintenance and of operation is low.

A further object of the invention is to provide means operable from an operator's station adjacent one end of the transfer device for controlling both the operation of the transfer carrier, and for controlling a mechanism for shifting a discharge conveyer to different positions of adjustment.

A further object of the invention is to provide a reciprocating transfer carrier having actuating mechanism and a manually operable controlling member by which the operation of the mechanism is controlled, in such manner that a single reciprocating movement is imparted to the carrier when the controlling member is actuated.

A further object of the invention is to provide a reciprocating transfer carrier which is held in raised position for movement in one direction and in lowered position for movement in the opposite direction and which is so counterbalanced that it is held by gravity in either the raised or lowered position.

A further object of the invention is to provide manually operated means for raising or lowering the transfer carrier and for simultaneously controlling the actuating mechanism by which the carrier is shifted.

A further object of the invention is to provide a discharge conveyer which is provided with manually controlled power operated mechanism by which it may be raised or lowered and held in different positions of adjustment.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification, of which:

Fig. 4 is a side elevation of the machine, looking toward the right-hand side thereof as shown in Fig. 1;

Fig. 5 is a fragmentary section through the upper portion of the transfer table taken on the line indicated at 5—5 in Fig. 1;

Fig. 6 is a section taken on the line indicated at 6—6 in Fig. 1;

Fig. 11 is a sectional detail view showing the spring latch on the transfer carriage for retaining the same in forward position until lowered; and Fig. 12 is a sectional detail view showing the spring buffer on the transfer carriage.

Fig. 13 is a detail view showing the spring pressed latch on the carrier.

Figure 1:
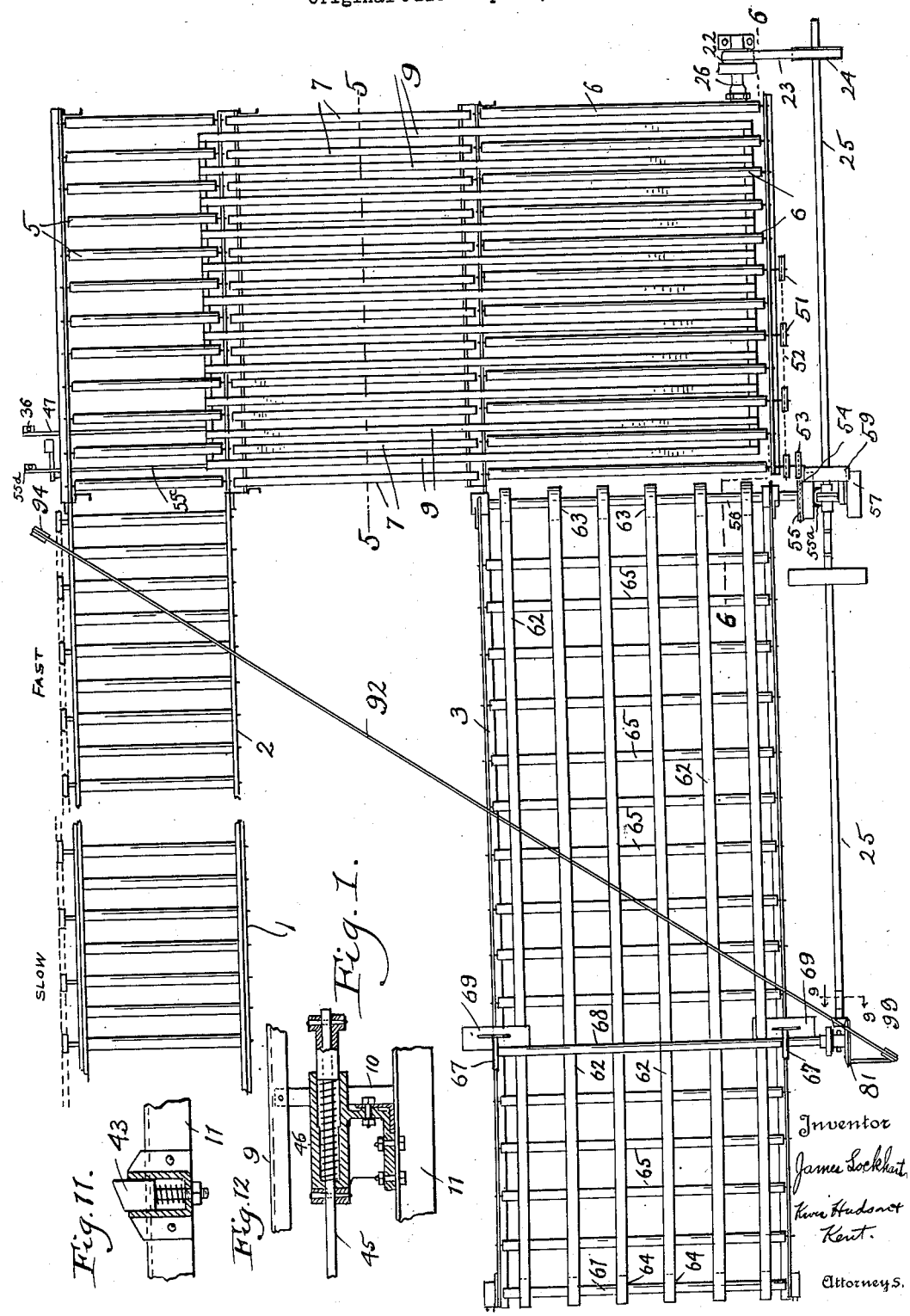
Fig. 1 is top plan view of a machine embodying the invention.

In the accompanying drawings, the invention is illustrated as a machine designed to handle composition board in which the pieces are delivered from a forming machine onto a conveyer extending alongside a drying oven and past the end thereof to a transfer device and from a transfer device to a second conveyer, parallel with the first and running in the opposite direction, which delivers the pieces into the drying oven. A portion of the conveyer which receives the pieces is indicated by the numeral 1, in Fig. 1, this conveyer being a roller conveyer provided with continuously driven rollers. Adjacent the transfer table, the conveyer 1 has a section 2 in which the rollers are driven at a higher rate of speed to provide an interval between the delivery of successive pieces to the transfer device. The pieces are delivered one at a time onto the transfer table and from the transfer table are delivered to a discharge conveyer 3, which is parallel with the conveyer 1 and is driven in the opposite direction.

The transfer table has a supporting frame 4 which extends across the discharge end of the conveyer 1, across the space between the conveyers 1 and 3 and across the receiving end of the conveyer 3. In front of the discharge end of the conveyer 1 a bed of idle rollers 5 is mounted upon the frame 4, at the level of the rollers of the discharge section 2 of the conveyer 1. At the opposite end of the transfer table, there is mounted a bed of rollers 6 in front of the receiving end of the discharge conveyer 3. Some of the rollers of the bed 6 are idle rollers and others are positively driven in a direction to transfer pieces from the table onto the conveyer 3. The individual rollers 5 of the roller bed at the receiving end of the transfer table are in longitudinal alignment with the individual rollers 6 at the discharge end of the transfer table, and the space between the two roller beds is bridged by a series of bars 7, fixed to the frame 4 and in longitudinal alignment with rollers 5 and 6 of the two roller beds. The rollers 5 and 6 are journalled in bearings at the upper end of posts $5^a$ and $6^a$ and the opposite ends of the fixed bars 7 are supported upon the upper end of the vertical posts 8, the posts $5^a$, $6^a$ and 8 being fixed to the frame 4. The mounting of the rollers 5 and 6 and the intermediate bar 7 provides open spaces for the full length of the transfer table between successive rollers and bars and in these spaces, there are mounted transfer bars 9 which are supported by vertical posts 10 from a carriage 11 which is mounted for longitudinal movement in the frame. The length of the transfer bars 9 is less than the length of the table by an amount substantially equal to the length of the rollers of the bed 5 at the receiving end thereof, so that the transfer bars can be reciprocated from a position in which the rear ends thereof are substantially at the rear end of the transfer table to a position at which the rear ends thereof are adjacent the inner side of the roller bed 5.

The carriage 11 is provided with supporting wheels 12 which travel upon a track frame having longitudinal rails 13 connected by cross bars 14. The carriage 11 is shifted in one direction on the track frame by means of an endless sprocket chain 15 running over sprockets 16 and 17, which are mounted upon transverse shafts adjacent the discharge end of the table. The sprocket chain 15 is connected to the carriage 11 by means of a drag chain 18 which is connected at one end to the carriage and at the other end to a link of the chain 15. The sprockets 16 and 17 are spaced apart a distance substantially corresponding to the travel of the carriage 11 on the transfer frame and the sprocket 16 is fixed to a shaft 21, which may be driven in a direction to cause the lower run of the sprocket chain 15 to travel toward the discharge end of the transfer table. The movement of the chain 15 causes the carriage 11 to be drawn to the discharge end of the table. Movement of the carriage 11 in the opposite direction is effected by means of a counterweight 19 carried by a cable 20 which is attached to the end of the carriage 11 adjacent the receiving end of the transfer table, the cable 20 being guided over suitable sheaves $20^a$ and $20^b$ to the suspended counterweight.

The shaft 21 is driven through a pulley 22 which is loosely mounted on the shaft and connected by a belt 23 to a pulley 24, fixed to an overhead drive shaft 25. The actuation of the shaft 21 by the pulley 22 is controlled by a suitable clutch having a shiftable element 26 by which the pulley 22 may be locked to the shaft 21 or freed therefrom. Means may be provided for automatically actuating the shiftable clutch member 26 to free the shaft from the pulley 22 when the carriage 11 reaches its forward position, to permit it to be returned by the counterweight 19, as will be presently explained.

Figure 2:
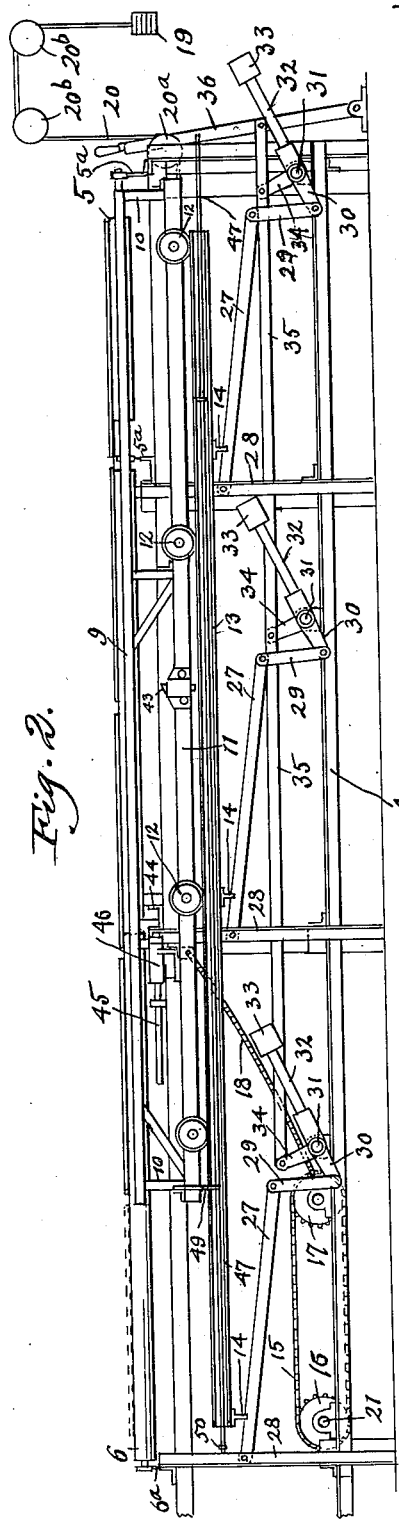
Fig. 2 is a side elevation of the transfer table showing the transfer carriage in lowered position.
Figure 3:
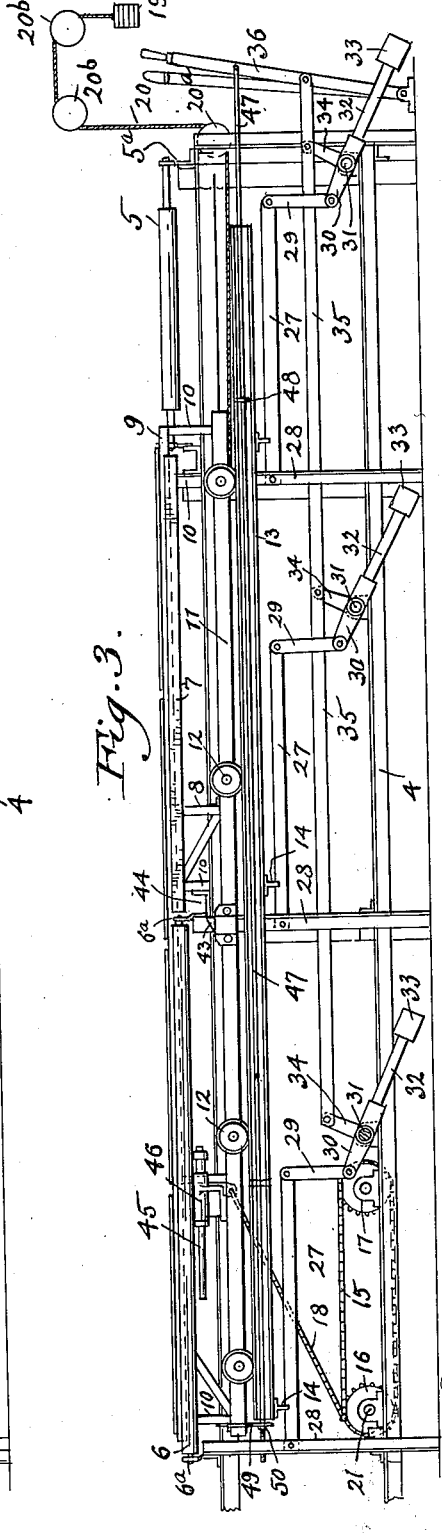
Fig. 3 is a side elevation of the transfer table showing the transfer carriage in raised position.

In order to enable the articles to be conveyed step by step from the receiving roller bed to the discharging roller bed of the table, it is necessary that means be provided for holding the transfer bars 9 in a position above the level of the rollers 5 and 6 and intermediate bars 7 during the forward movement of the bars and to support the same in a position below the top surfaces of the rollers and intermediate supporting bars 7 during the return movement of the transfer bars. To accomplish this result, the track frame upon which the carriage 11 travels is mounted for vertical movement in the frame 4. Each of the cross bars 14 of the track frame is T-shaped in cross section and secured to the undersides of the rails 13. The webs of the cross bars 14 rest upon supporting levers 27 which are pivoted at their forward ends to vertical posts 28 of the supporting frame 4. The levers 27 are arranged in pairs, the levers of each pair being adjacent opposite sides of the frame 4 and engaging the cross bars 14 adjacent opposite ends thereof at a point close to the forward ends of the levers. The rear ends of the levers 27 are connected to the upper ends of short links 29 which are connected at their lower ends to actuating arms 30 which are fixed to transverse shafts 31 extending across the lower portion of the frame 4. Fixed to the shafts 31 there are rearwardly extending arms 32 which carry counterweights 33, which serve to counterbalance the track frame and carrier supported thereon. Each of the shafts 31 has an upwardly extending arm 34 fixed thereto and the upper ends of these arms are pivoted to an elongated bar 35 extending longitudinally of the frame and projecting beyond the rear end of the frame. The rear end of the bar 35 is connected to a hand lever 36 by means of which the bar 35 may be shifted to simultaneously actuate the shafts 31 and through the levers 27 raise or lower the track frame. The counterweights 33 act through the arms 30 and links 29 to hold the track frame 13 in elevated position. As shown in Fig. 3, the levers 27, when the track 13 is in elevated position, are substantially horizontal and the links 29 and actuating arms 30 form toggles which the counterweights 33 tend to straighten. The leverage between the counterweights 33 and levers 27 is such that, when the frame 13 is in elevated position, the frame is overbalanced by the counterweights and held by the counterweights in elevated position. When the bar 35 has been shifted to elevate the counterweights 33 and lower the frame 13 to the position shown in Fig. 2, the effective leverage of the counterweights 33 is decreased to an extent such that the weight of the frame 13 overbalances the counterweights and the frame is retained by gravity in its lowered position.

Figure 7:
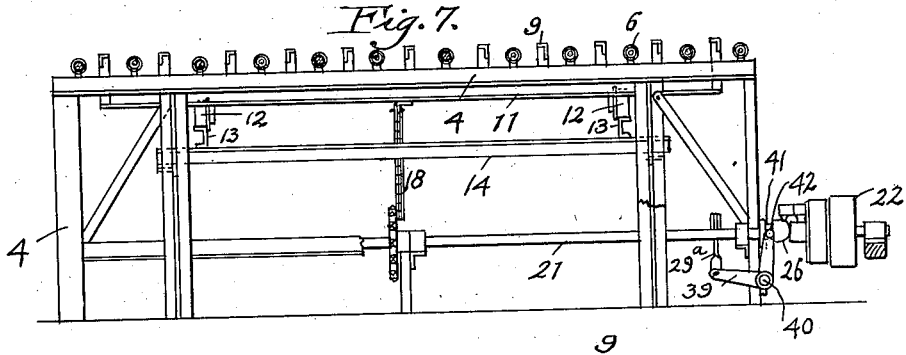
Fig. 7 is an end elevation of the transfer table looking toward the end from which the articles are discharged.
Figure 8:
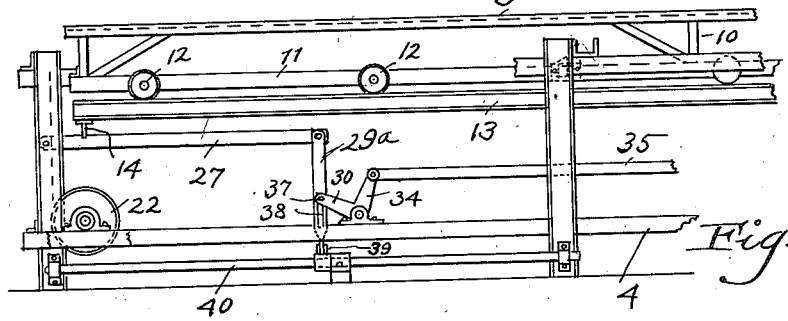
Fig. 8 is a fragmentary side elevation of the forward portion of the transfer table looking toward the side thereof opposite that shown in Figs. 2 and 3.
Figure 9:
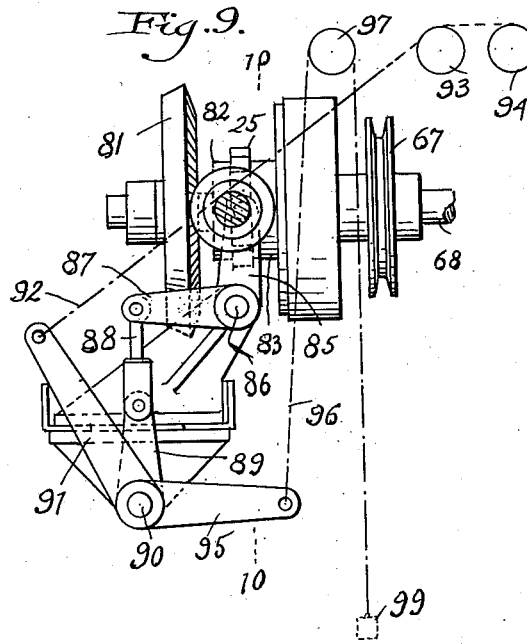
Fig. 9 is a detail view showing the controlling mechanism for the conveyer hoist, the view being taken on the line indicated at 9—9 of Fig. 1.
Figure 10:
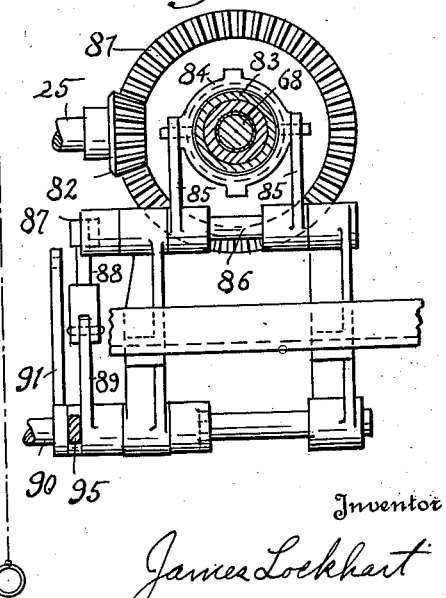
Fig. 10 is a section taken on the line indicated at 10—10 in Fig. 9.

As shown in Figs. 7 and 8 of the drawings, one of the connecting links 29a, between the lever 27 and actuating arm 30, is extended below the arm 30 and connected to the arm 30 by means of a pin 37 and slot 38 extending longitudinally of the link. The lower end of the link 29a is connected to an arm 39 fixed to a rock shaft 40, at one side of the frame and the shaft 40 carries a shifter arm 41 which engages in a groove 42 in the clutch collar 26. When the track frame 13 is lowered, by moving the bar 35 forwardly, the link 29a rocks the arm 39 downwardly and the shifter arm 41 fixed to the shaft 40 is rocked in the direction to shift the clutch member 26 to releasing position. The releasing of the shaft 21 permits the sprocket chain 15 to be rotated in a reverse direction so that the counterweight 19 can shift the carriage 11 to its rearmost position between the receiving rollers 5. When an article such as a piece of composition board has been delivered upon the roller bed 5, the operator will pull the lever 36 rearwardly causing the carriage 11 to be raised to elevated position, at the same time the shaft 40 will be rocked in a direction to cause the shifter arm 41 to move the clutch member 26 to engaging position, whereupon the shaft 21 will be driven in a direction to cause the sprocket chain 15 to pull the carriage to its forward position.

To prevent return movement of the carriage 11, while in elevated position, the carriage is provided with a spring latch 43 which engages with a cross bar 44 extending across the top of the frame 4, as the carriage approaches its forward limit of movement. After passing the cross bar 44, the latch 43 springs into place in front of the bar 44 so that, before the carriage can be returned by the counterweight 19, the carriage must first be lowered sufficiently to bring the bars 9 below the top surfaces of the rollers 5 and 6 and fixed bars 7. The return movement of the carriage 11, by the counterweight 19, is an accelerated movement and for this reason a spring buffer is provided for relieving the shock of impact when the carrier is brought to a stop at the rear end of the frame. This buffer consists of a rod 45 which is slidably mounted in a spring barrel 46 and positioned to engage with the cross bar 44 as the carriage approaches its rearmost position. The spring within the barrel 46 serves to take up the shock of impact and gradually bring the carriage to a stop.

Means is preferably provided for automatically lowering the carriage to permit it to be moved to its rearmost position upon completion of the forward stroke. To this end a rod 47 is slidably mounted in guides 48 on one of the track rails 13 and this rod is connected at one end to the lever 36 and projects beyond the forward end of the track frame. The carriage 11, at its forward end, is provided with a depending plate 49 through which the rod 47 extends and in which the rod has a sliding fit. At the forward end thereof, the rod is provided with an adjustable nut 50, which is so positioned as to be engaged by the plate 49 as the carriage 11 approaches its forward limit of movement. The engagement of the plate 49 with the nut 50 causes the rod 47 to be drawn forwardly and with it the lever 36 and actuating rod 35 causing the track frame to be lowered and the clutch member 26 to be actuated to free the shaft 21, releasing the latch 43 and sprocket chain 15 so that the carriage can be returned by the counterweight 19.

In order to deliver the pieces of composition board or other articles from the transfer table onto the conveyer 3, some of the rollers of the bed 6, preferably alternate rollers adjacent the conveyer 3, may be driven in the direction to convey articles from the roller bed 6 to the conveyer 3. These rollers are driven by means of sprockets 51, fixed to the shafts of the rollers beyond the end of the frame and having an endless sprocket chain 52 extending over them. The shaft of the roller adjacent the conveyer 3 is provided with a second sprocket 53 over which runs a sprocket chain 54, which is driven by a sprocket 55 on the shaft 56 which supports the inner end of the conveyer 3. The shaft 56 has a pulley 57 fixed thereto which is driven by a belt 58, which extends from a pulley 59 on the overhead drive shaft 25.

In order to prevent slewing of the boards on the discharge bed and to prevent scuffing of the under side of the boards by the engagement of rotating rollers therewith as the carriage is lowered, means is provided for manually controlling the operation of the discharge rollers. To this end the sprocket 55 is rotatably mounted on the shaft 56 and is provided with a clutch which has a shiftable element 55ª keyed to the shaft by which the pulley may be secured to or released from the shaft 56. The clutch element 55ª is operated by a shifter lever 55ᵇ which engages the shiftable clutch element 55ª at its upper end and is pivoted at its lower end to the frame, the lever 55ᵇ being connected by a rod 55ᶜ to a hand lever 55ᵈ at the receiving end of the transfer table so that the operator can control the operation of the shaft 56 and the operation of the discharge rollers and discharge conveyer driven thereby.

The conveyer 3 is mounted upon a trussed frame 60 which is pivoted to swing vertically upon the horizontal shaft 56 and has a transverse shaft 61 at its outer end, which is parallel with the shaft 56. The conveyer 3 consists of a series of parallel belts 62 which extend over pulleys 63, fixed to the shaft 56 and over pulleys 64 on the shaft 61, the belts being supported intermediate the ends of the conveyer by transverse idle rollers 65.

For raising and lowering the outer end of the conveyer 3 and for holding the same in different positions of adjustment, the conveyer frame 60 is suspended from an overhead support by means of a pair of supporting cables 66 connected at their lower ends to opposite sides of the frame 60. The cables 66 pass over sheaves 67 provided with V grooves in which the cables are wedged and fixed to a transverse shaft 68. The cables have free ends extending downwardly from the drums to which are attached counterweights 69, which partially counterbalance the weight of the frame 60.

The conveyer 3 is designed to deliver into any one of a number of superposed compartments in a drying oven and means is provided for supporting the conveyer 3 in a position to deliver into any one of these compartments. In the outer end thereof the frame 60 is provided with a spring latch 70 which is adapted to engage with teeth 71 of a fixed supporting rack 72. The teeth 71 are so spaced as to position the discharge end of the conveyer 3 in alignment with any one of the superposed compartments of the dryer. The latch 70 is spring-pressed toward the rack 72 and the teeth 71 are so formed that the latch 70 will be forced to disengaging position and ride over the teeth upon upward movement of the frame 60 but prevent passage of the latch 70 in a downward direction, thereby holding the frame 60 in any position to which it had been raised. In order to permit lowering of the frame 60, means is provided for manually releasing the latch 70 to permit the frame 60 to move downwardly by gravity. The manually operable means consists of a rod 73 connected to the latch 70 and to an extending arm 74, fixed to a shaft 75 adjacent the pivoted end of the frame 60. An arm 76 is fixed to the shaft 75 and connected at its outer end to the upper end of a link or connecting rod 77, which is connected at its lower end to an actuating arm 78, fixed to a rock shaft 79 extending the full length of the transfer frame 4, adjacent the bottom thereof. At the end of the rock shaft 79, which projects beyond the receiving end of the transfer frame, there is a treadle 80 attached thereto which, when depressed, rocks the shaft 79 in a direction to rock the arms 78 and 76 upwardly and the arm 74 rearwardly to retract the latch 70. If the operator momentarily depresses the treadle 80, the latch 70 will be disengaged from the supporting tooth 71, with which it engages, and the frame 60 which slightly overbalances the counterweights 69 will descend slowly until the latch 70 comes into engagement with the next lower supporting tooth 71.

Means is also provided for operating the shaft 68 to wind up the cable 66 and elevate the frame 60, the shaft 68 being provided with a bevel gear 81 loosely mounted thereon which is continuously driven by a bevel gear 82 meshing therewith and fixed to the overhead drive shaft 25. For connecting the shaft 68 to the bevel gear 81 for rotating the drums to raise the frame 60, a suitable clutch is provided which has a shiftable member 83. The shiftable clutch member 83 has a shifter ring 84 loosely mounted thereon to the opposite sides of which are pivoted shifter arms 85, which are fixed to a shaft 86 extending transversely beneath the shaft 68 and journaled in a fixed supporting member which may be suspended from a ceiling or other overhead support. To one end of the shaft 86, there is fixed a laterally extending arm 87 which is connected by a link 88 to an actuating arm 89, fixed to a rock shaft 90 journaled in the fixed supporting member below the shaft 68. The shaft 90 has fixed thereto an actuating arm 91 to which is connected an operating cable 92 which extends over guide sheaves 93 and 94 and has its free end hanging down from the sheave 94 adjacent the receiving end of the transfer table. The operator, by pulling on the cable 92, can rock the shaft 90 and through the arm 89, link 88, arm 87 and shaft 86, rock the shifter arm 85 in a direction to shift the clutch member 83 to engaging position and connect the gear 81 to the shaft 68 to elevate the conveyer frame 60.

The rock shaft 90 is also provided with a second actuating arm 95 to which is attached an actuating cable 96, which extends over a sheave 97 above one of the counterweights 69 and hangs down from the sheave 97 through a guide plate 98 attached to one of the counterweights. At the lower end thereof, the cable 96 has attached thereto a button 99, which is engaged by the plate 98 when the counterweight has been lowered a predetermined distance. The clutch member 83 is disengaged by means of the cable 96 when the frame 60 has been raised to a predetermined height, the raising of the frame causing the counterweights 69 to be lowered a distance corresponding to the upward movement of the frame 60 and causing the counterweight to which the plate 98 is attached to exert a downward pull on the cable 96 to shift the clutch member 83 to releasing position.

In the normal operation of the machine, the frame 60 will first be raised to deliver into the uppermost compartment of the dryer and after a sufficient number of pieces have been delivered into this compartment, the operator standing at the receiving end of the transfer frame, will depress the treadle 80, causing the frame 60 to be lowered to position the conveyer 3 in alignment with the next lower compartment. This operation will be repeated until the lowermost compartment is reached, whereupon the operator will pull down upon the end of the cable 93 causing the clutch member 83 to be shifted into engaging position, whereupon the drums 67 will be operated to elevate the frame 60 to the uppermost position thereof, at which time, the plate 98 of the counterweight 69 will engage with the button 99 on the cable 66 and disengage the clutch member 83.

The operator standing at the receiving end of the transfer table is within easy reach of the lever 36, controlling the actuation of the transfer carrier, so that as soon as an article has been delivered from the roller bed 5, the carrier may be actuated to lift the article off the bed 5 and transfer it to the fixed supporting bar 7, successive actuations of the carrier causing the article to be advanced, step by step, along the fixed bar 7 and onto the delivery bed 6. The clutch controlling lever 55$^d$ is alongside the carrier controlling lever 36 so that the operator can cause the delivery rollers to be operated to transfer an article to the delivery conveyer after an article has been deposited on the roller bed at the delivery end of the table and can stop the delivery rollers while an article is being delivered thereto by the transfer carrier. The treadle 80 controlling the lowering of the delivery conveyer and the cable 92, controlling the lifting of the delivery conveyer, are also within easy reach of the operator so that the operator, in addition to controlling the operation of the transfer carrier and delivery rollers, controls the delivery of the articles from the delivery conveyer into the various compartments of the dryer.

Having described my invention, I claim:

1. The combination with a pair of spaced conveyers, of a transfer device comprising a frame having spaced, longitudinally extending supporting members upon which articles are delivered by one conveyer and from which the articles are delivered to the other conveyer, a transfer carriage having bars positioned between said supporting members, means for normally supporting the bars adjacent the receiving end of the carriage with the bars thereof below the tops of the supporting members, a manually operable controlling member, means operable upon actuation of said controlling member for lifting the carriage to bring the bars thereof above the supporting members and for moving the same toward the delivery end of the frame, and means for automatically lowering the carriage and returning the same to normal position.

2. The combination with a pair of spaced conveyers, of a transfer device comprising a frame having spaced, longitudinally extending supporting members upon which articles are delivered by one conveyer and from which the articles are delivered to the other conveyer, a transfer carriage having bars positioned between said supporting members, means for normally supporting the carriage adjacent the receiving end of the frame with the bars thereof below the tops of the supporting members, manually operable means for lifting said carriage to a position in which the bars thereof are higher than the supporting members, mechanism operable automatically upon the lifting of the carriage for moving the same toward the delivery end of the frame, and means for automatically lowering the carriage and returning the same to normal position.

3. The combination with a pair of spaced conveyers, of a transfer device comprising a frame having spaced, longitudinally extending supporting members upon which articles are delivered by one conveyer and from which the articles are delivered to the other conveyer, a transfer carriage having bars positioned between said supporting members, means for normally supporting the carriage adjacent the receiving end of the frame with the bars thereof below the tops of the supporting members, manually operable means for lifting said carriage to a position in which the bars thereof are higher than the supporting members, mechanism operable automatically upon the lifting of the carriage for moving the same toward the delivery end of the frame, means controlled by carriage during its forward movement for lowering the carriage, and means operable upon the lowering of the carriage for returning the same to normal position.

4. The combination with a pair of laterally spaced conveyers, of a transfer device comprising a frame extending across the ends of the conveyers, a bed of idle rollers at one end of the frame in alignment with the discharge end of one conveyer, a bed of rollers at the opposite end of the frame in alignment with the receiving end of the other conveyer, the rollers of one bed being in longitudinal alignment with rollers of the other, fixed bars extending between the ends of aligned rollers, a transfer carrier, having spaced bars lying between the fixed bars and the rollers aligned therewith, means for raising the carrier to position the bars thereof higher than the fixed bars and rollers and for lowering the same below the fixed bars and rollers, means for moving the carrier toward the delivery end of the frame while in raised position, and means for moving the carrier toward the receiving end of the frame while in lowered position.

5. The combination with a pair of laterally spaced conveyers, of a transfer device comprising a frame extending across the ends of the conveyers, a bed of idle rollers at one end of the frame in alignment with the discharge end of one conveyer, a bed of rollers at the opposite end of the frame in alignment with the receiving end of the other conveyer, the rollers of one bed being in longitudinal alignment with rollers of the other, fixed bars extending between the ends of aligned rollers, a transfer carrier having spaced bars lying between the fixed bars and the rollers aligned therewith, manually operable means for raising the carrier to a position in which the bars thereof are higher than the rollers and fixed bars, means operable automatically upon the lifting of the carrier for moving the same toward the delivery end of the frame, means controlled by the carrier for lowering the same, and means operable automatically upon the lowering of the carrier for returning the same to the receiving end of the frame.

6. A transfer table comprising a supporting frame having spaced, longitudinally extending article supporting members, a longitudinally extending track frame beneath said supporting members, means for raising and lowering said track frame, a carriage mounted for movement on said track frame and having article supporting bars positioned between the supporting members on the frame, and means for moving said carriage back and forth on said track frame.

7. A transfer table comprising a supporting frame having spaced, longitudinally extending article supporting members, a longitudinally extending track frame beneath said supporting members, means for raising and lowering said track frame, a carriage mounted for movement on said track frame and having article supporting bars positioned between the supporting members on the frame, and means controlled by said raising and lowering means for moving said carriage back and forth on said track frame.

8. A transfer table comprising a supporting frame having spaced, longitudinally extending article supporting members, a vertically movable longitudinally extending track frame, a carriage mounted for movement on said track frame and having article supporting bars positioned between said supporting members, means for raising and lowering the track frame, and means controlled by the movements of the track frame for moving the carriage.

9. A transfer table comprising a supporting frame having spaced, longitudinally extending article supporting members, a vertically movable longitudinally extending track frame, a carriage mounted for movement on said track frame and having article supporting bars positioned between said supporting members, manually operable means for lifting the track frame, means controlled by the lifting of the track frame for moving the carriage forwardly, means controlled by the forward movement of the carriage for lowering the track frame, and means controlled by the lowering of the track frame for returning the carriage.

10. A transfer table comprising a supporting frame having spaced, longitudinally extending article supporting members, a carrier having supporting bars positioned between said supporting members, said carrier being mounted for vertical movement from a position in which the supporting bars are higher than the supporting members to a position in which the supporting bars are lower than the supporting members and for movement longitudinally of the supporting members, means for raising and lowering the carrier and for moving the same back and forth longitudinally, and counterbalancing means so connected to the carrier as to overbalance the carrier when the same is in elevated position, whereby the carrier is held in elevated position by the counterbalancing means, and to be overbalanced by the carrier when the same is in lowered position so that the carrier is held by gravity in lowered position.

11. A transfer table comprising a supporting frame having spaced, longitudinally extending supporting members, a longitudinally extending track frame beneath said supporting members, a carriage on said track frame mounted for movement longitudinally thereof and having track supporting bars positioned between the supporting members on the frame, means for raising and lowering said track frame and for moving said carriage back and forth on said track frame, and gravity actuated counterbalancing means so connected to said track frame that said frame is held by gravity in either raised or lowered position.

12. The combination of a transfer table comprising a supporting frame and a reciprocable carrier, for advancing articles from one end to the other of the frame, a conveyer for delivering articles one at a time to one end of said transfer device, a vertically adjustable delivery conveyer adapted to receive articles from the delivery end of the transfer device, means for actuating the carrier, means for raising and lowering the delivery conveyer and for supporting the same in adjusted positions, and manually operable means for controlling the carrier actuating and conveyer raising and lowering means.

13. The combination of a transfer table comprising a supporting frame and a reciprocable carrier, for advancing articles from one end to the other of the frame, a conveyer for delivering articles one at a time to one end of said transfer device, a vertically adjustable delivery conveyer adapted to receive articles from the delivery end of the transfer device, means for actuating the carrier, means for raising and lowering the delivery conveyer and for supporting the same in adjusted positions, a manually operable member for controlling the carrier operating means, and manually operable means adjacent said controlling member for controlling said raising and lowering means.

14. The combination of a transfer table comprising a supporting frame and a reciprocable carrier, for advancing articles from one end to the other of the frame, a conveyer for delivering articles one at a time to one end of said transfer device, a vertically adjustable delivery conveyer adapted to receive articles from the delivery end of the transfer device, means for actuating the carrier, means for raising and lowering the delivery conveyer and for supporting the same in adjusted positions, a manually operable member at the receiving end of the transfer device for controlling said carrier operating means, a hoist connected to the delivery conveyer, releasable means for holding said delivery conveyer in different positions of adjustment, a manually operable member adjacent the first mentioned member for controlling said hoist, and a manually operable member adjacent the first mentioned member for controlling said holding means.

15. In a device of the character described, a transfer table having a transversely extending bed of rollers at each end and a reciprocating carrier for advancing articles from one roller bed to the other, a conveyer delivering to one of said roller beds, a delivery conveyer having its receiving end positioned to receive articles from the other roller bed and hinged to the table to swing vertically, means for actuating said carrier, means for raising and lowering said delivery conveyer, and means within the reach of an operator at the receiving end of the table for controlling said carrier operating means, and said conveyer raising and lowering means.

16. In a device of the character described, a conveyer mounted for movement about a horizontal axis at one end thereof, hoisting means connected to said conveyer, a counterbalance for said conveyer, means for driving the hoisting means in a direction to raise the conveyer, manually operable means for connecting said driving means to the hoisting means, and means controlled by the counterbalance for disconnecting said driving means.

17. In a device of the character described, a conveyer mounted for movement about a horizontal axis, hoisting means connected to said conveyer for swinging the same vertically, means for actuating said hoisting means and for automatically releasing the same when an end of the conveyer has reached a predetermined height, a supporting member adjacent the conveyer provided with vertically spaced projections, a yieldable latch carried by the conveyer adapted to ride over said projections during upward movement and engage with said projections to support the conveyer, and manually operable means for releasing the latch to permit lowering of the conveyer.

18. In a device of the character described, a conveyer mounted for movement about a horizontal axis, means for lifting an end of the conveyer, a supporting member adjacent the conveyer provided with vertically spaced supporting projections, a yieldable latch on the conveyer engageable with said projections to support said end of the conveyer at different heights, said latch being adapted to ride over said projections upon upward movement of said end of the conveyer, and manually operable means for releasing said latch.

19. In a device of the character described, a transfer table including a reciprocable carrier for conveying articles from one end of the table to the other and having means for discharging articles laterally from the opposite end of the table, means for delivering articles one at a time upon the receiving end of the table, a delivery conveyer having its inner receiving end hinged to the table and in a position to receive articles therefrom, power actuated means for lifting said conveyer, means including a manually operable controlling element extending to a point adjacent the receiving end of the table for controlling the operation of the lifting means, a stationary member adjacent the conveyer, means on said conveyer engageable with said stationary member for supporting the outer end of the conveyer at different heights, manually operable means having an actuating part adjacent the receiving end of the table for disengaging said supporting means, and means including a manually operable member adjacent the receiving end of the transfer table for controlling actuations of said carrier.

20. A transfer table comprising a supporting frame having spaced longitudinally extending article supporting members, a track frame beneath said supporting members, a plurality of levers supporting said table at longitudinally spaced points, said levers being pivoted to said frame to swing vertically, a plurality of spaced rock shafts having arms fixed thereto, links connecting said levers to said arms, means for simultaneously rocking said shafts to actuate said levers to raise or lower said frame, frame counterbalancing means connected to said shafts, a carriage mounted on said frame for movement longitudinally of the table, said carriage having article supporting bars lying between said supporting members, and means controlled by the raising and lowering of said track frame for moving the carriage back and forth thereon.

21. In a device of the character described, a transfer table having a transversely extending bed of rollers at each end and a reciprocating carrier for advancing articles from one roller bed to the other, a conveyer delivering to one of said roller beds, a delivery conveyer having its receiving end positioned to receive articles from the other roller bed, means for driving rollers of the latter bed in a direction to transfer articles to the delivery conveyer, means for actuating said carrier, and means within reach of an operator at the receiving end of the table for controlling said carrier operating means and said roller driving means.

22. A transfer table comprising a supporting frame having spaced article supporting members, a transfer carrier having spaced bars lying between said supporting members, means for normally supporting said carrier with the bars thereof below said supporting members, means for raising said carrier to elevate the bars thereof above said supporting members and for moving the carrier longitudinally, and means controlled by the longitudinal movement of said carrier for lowering the same and returning it to its normal position.

23. The combination of a transfer table comprising a supporting frame and a reciprocable carrier for advancing articles from one end to the other of the frame, a conveyer for conveying the articles one at a time to one end of said transfer device, a vertically adjustable delivery conveyer adapted to receive articles from the delivery end of the transfer device, means for actuating the carrier, means for raising and lowering the delivery conveyer and for supporting the same in adjusted position, manually operable means for controlling said operating means, a hoist connected to the delivery conveyer, releasable means for holding said delivery conveyer in different positions of adjustment, manually operable means for controlling said hoist, and manually operable means for controlling said holding means.

24. In a device of the character described, a conveyer mounted for vertical movement, hoisting means connected to said conveyer for moving the same vertically, means for actuating said hoisting means and for automatically releasing the same when the conveyer has reached a predetermined height, a supporting member adjacent the conveyer, cooperating latching members on the conveyer and supporting member for releasably supporting the conveyer at different heights on said member, and means for releasing the latch to permit lowering of the conveyer.

25. In a device of the character described, a transfer table having a transversely extending bed of rollers at each end, a reciprocable carrier for advancing articles from one roller bed to the other, a conveyer delivering to one of said roller beds, a delivery conveyer having its receiving end positioned to receive articles from the other roller bed, means for driving rollers of the latter bed in a direction to transfer articles to the delivery conveyer. means for actuating said carrier, and manually operable means for independently controlling said carrier operating means and said roller driving means.

In testimony whereof, I hereunto affix my signature.

JAMES LOCKHART.